United States Patent
Wu

(10) Patent No.: US 11,588,753 B2
(45) Date of Patent: Feb. 21, 2023

(54) METHODS AND SYSTEMS FOR GENERATING DEPLOYMENT ARCHITECTURE AND TEMPLATE

(71) Applicant: ALIBABA GROUP HOLDING LIMITED, Grand Cayman (KY)

(72) Inventor: Junyin Wu, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/723,653

(22) Filed: Dec. 20, 2019

(65) Prior Publication Data

US 2021/0194824 A1    Jun. 24, 2021

(51) Int. Cl.
  *H04L 47/70* (2022.01)
  *H04L 47/78* (2022.01)
  *H04L 67/10* (2022.01)
  *G06F 9/54* (2006.01)

(52) U.S. Cl.
  CPC ............... *H04L 47/82* (2013.01); *G06F 9/54* (2013.01); *H04L 47/78* (2013.01); *H04L 67/10* (2013.01)

(58) Field of Classification Search
  CPC ......... H04L 47/82; H04L 47/78; H04L 67/10; G06F 9/54
  See application file for complete search history.

(56) References Cited

U.S. PATENT DOCUMENTS

| | | | |
|---|---|---|---|
| 10,382,353 B1* | 8/2019 | Krishnan | G06F 3/04847 |
| 2015/0205624 A1* | 7/2015 | Zhang | H04L 41/0806 |
| | | | 719/327 |
| 2016/0077807 A1* | 3/2016 | Newman | G06F 9/5072 |
| | | | 717/104 |
| 2017/0295231 A1* | 10/2017 | Clemm | H04L 67/06 |
| 2017/0351716 A1* | 12/2017 | Higginson | G06F 16/214 |
| 2019/0124018 A1* | 4/2019 | Zhang | G06F 9/45558 |

* cited by examiner

*Primary Examiner* — Viet D Vu
(74) *Attorney, Agent, or Firm* — Finnegan, Henderson, Farabow, Garrett & Dunner, LLP

(57) ABSTRACT

The present disclosure provides methods and systems for generating deployment architecture and template. The method can include determining properties of the instantiated resources in the stack; and generating a template corresponding to the instantiated resources based on the properties.

9 Claims, 8 Drawing Sheets

METHODS AND SYSTEMS FOR GENERATING DEPLOYMENT ARCHITECTURE AND TEMPLATE

BACKGROUND

Conventional cloud service allows a client to orchestrate cloud resources based on a resource orchestration template. For example, the client can orchestrate cloud resources based on the resource orchestration template to eventually instantiate the cloud resources into instances (e.g., an elastic compute service (ECS) instance, a relational database service (RDS) instance, a server load balancer (SLB), a virtual private cloud, and the like). Therefore, a resource orchestration template can be used to instantiate cloud resources.

However, neither the resource orchestration template nor the instantiated cloud resources can provide visual illustration of the structured cloud resources. In addition to failing to provide visual illustration, when the client instantiates the cloud resources manually or using tools other than resource orchestration service (ROS), the instantiated cloud resources, the resource orchestration template, and the deployment architecture are not related.

SUMMARY OF THE DISCLOSURE

Embodiments of the disclosure provide a computer-implemented method for generating a template based on a stack of instantiated resources. The method can include: determining properties of the instantiated resources in the stack; and generating a template corresponding to the instantiated resources based on the properties.

Embodiments of the disclosure also provide a computer-implemented method for generating a template based on a deployment architecture. The method can include: receiving a deployment architecture; determining at least one component of the deployment architecture; and generating a template based on the at least one component.

Embodiments of the disclosure further provide a computer-implemented method for generating a deployment architecture based on a template. The method can include: receiving a template; determining resources of the template; selecting, among a plurality of architecture candidates, a deployment architecture candidate corresponding to the determined resources; and generating a deployment architecture by completing the deployment architecture candidate based on the determined resources.

Embodiments of the disclosure further provide a system for generating a template based on a stack of instantiated resources. The system can include: a memory storing a set of instructions; and at least one processor configured to execute the set of instructions to cause the system to: determine properties of the instantiated resources in the stack; and generate a template corresponding to the instantiated resources based on the properties.

Embodiments of the disclosure also provide a system for generating a template based on a deployment architecture. The system can include: a memory storing a set of instructions; and at least one processor configured to execute the set of instructions to cause the system to: receive a deployment architecture; determine at least one component of the deployment architecture; and generate a template based on the at least one component.

Embodiments of the disclosure also provide a system for generating a deployment architecture based on a template. The system can include: a memory storing a set of instructions; and at least one processor configured to execute the set of instructions to cause the system to: receive a template; determine resources of the template; select, among a plurality of architecture candidates, a deployment architecture candidate corresponding to the determined resources; and generate a deployment architecture by completing the deployment architecture candidate based on the determined resources.

Embodiments of the disclosure further provide a non-transitory computer readable medium that stores a set of instructions that is executable by at least one processor of a computer system to cause the computer system to perform a method for generating a template based on a stack of instantiated resources. The method can include: determining properties of the instantiated resources in the stack; and generating a template corresponding to the instantiated resources based on the properties.

Embodiments of the disclosure further provide a non-transitory computer readable medium that stores a set of instructions that is executable by at least one processor of a computer system to cause the computer system to perform a method for generating a template based on a deployment architecture. The method can include: receiving a deployment architecture; determining at least one component of the deployment architecture; and generating a template based on the at least one component.

Embodiments of the disclosure further provide a non-transitory computer readable medium that stores a set of instructions that is executable by at least one processor of a computer system to cause the computer system to perform a method for generating a deployment architecture based on a template. The method can include: receiving a template; determining resources of the template; selecting, among a plurality of architecture candidates, a deployment architecture candidate corresponding to the determined resources; and generating a deployment architecture by completing the deployment architecture candidate based on the determined resources.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the disclosure provide methods and systems for converting a stack of cloud resources, a resource orchestration template, and a deployment architecture. The methods and systems can provide conversion between any two of the stack, the resource orchestration template, or the deployment architecture.

Figure 1:
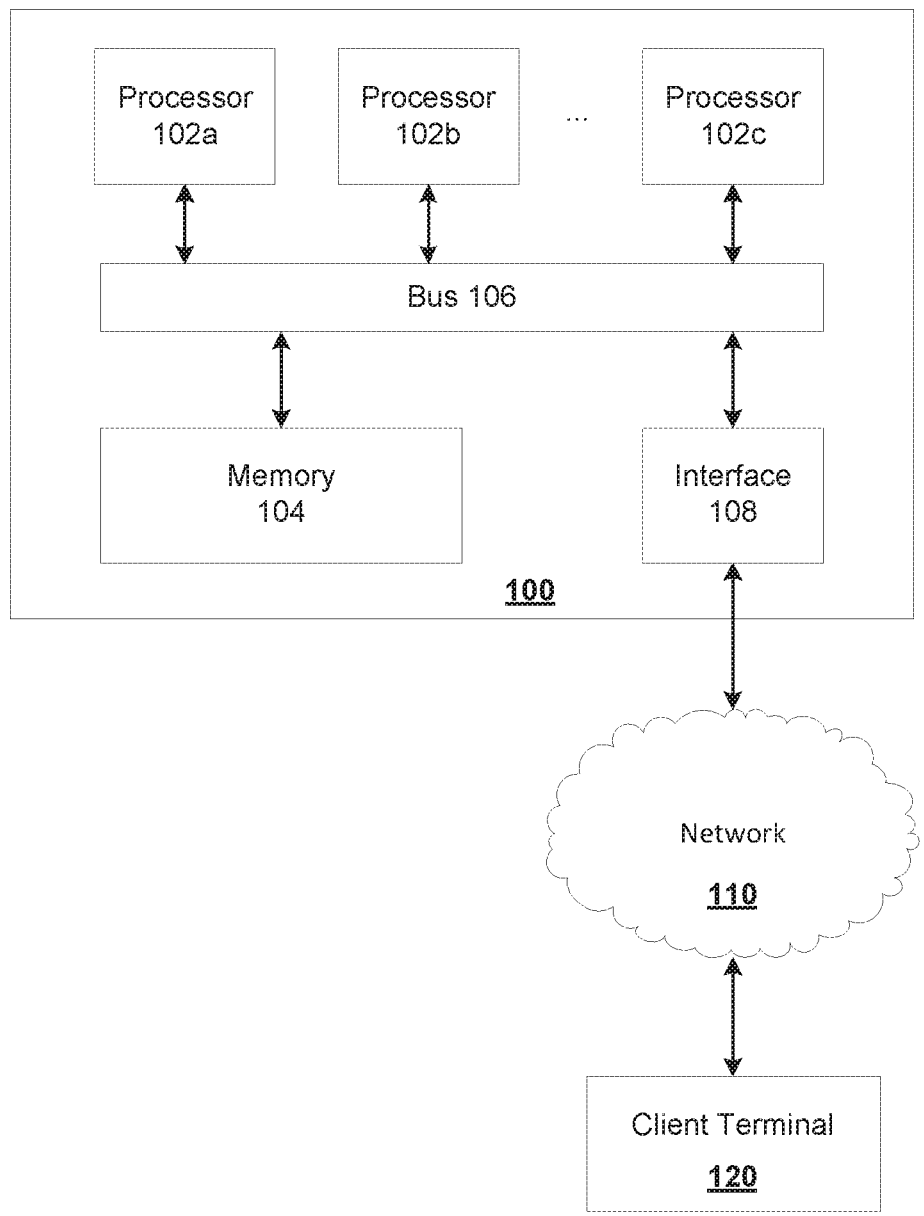
FIG. 1 illustrates a schematic diagram of an exemplary cloud service device, according to embodiments of the disclosure.

FIG. 1 illustrates a schematic diagram of an exemplary cloud service device 100, according to some embodiments of the disclosure. A plurality of cloud service devices 100 can form a cloud service system to provide cloud service to users. As shown in FIG. 1, cloud service device 100 can include at least one processor 102 (e.g., processor 102a, processor 102b, and processor 102c), a memory 104 communicatively coupled to at least one processor 102 via a bus 106, and an interface 108.

At least one processor 102 can be any suitable processor capable of executing instructions. For example, processor 102a can be an X86 processor or an ARM processor. In some embodiments, at least one processor 102 can also include an accelerator (e.g., neural processing unit) for providing computing capability related to neural networks, such as neural network training and inference.

Memory 104 can be configured to store instructions and data accessible by at least one processor 102. For example, the instructions can be executed by at least one processor 102 to cause cloud service device 100 to execute a variety of functions. In some embodiments, memory 104 can be implemented by any suitable technology, such as a static random access memory (SRAM), a synchronous dynamic RAM (SDRAM), a nonvolatile memory, and the like.

Bus 106 can be configured to provide connection among components of cloud service device 100. For example, at least one processor 102, memory 104, and network interface 106 can be connected with each other via bus 106.

Interface 108 can include a network interface providing wired or wireless network connection and an input/output (I/O) interface coupled with peripheral devices (e.g., a cursor control device, a keyboard, a display, and the like). The network interface can be configured to provide communication between device 100 and a client terminal 120 via a network 110. Network 110 can be Internet, a private network, and the like. In some embodiments, client terminal 120 can be a personal computer, a server, a smart phone, a tablet, or any computing device. The I/O interface can include at least one of a Universal Serial Bus (USB) port, a peripheral component interconnect express (PCI-E) port, and the like for connection with the peripheral devices.

Figure 2A:
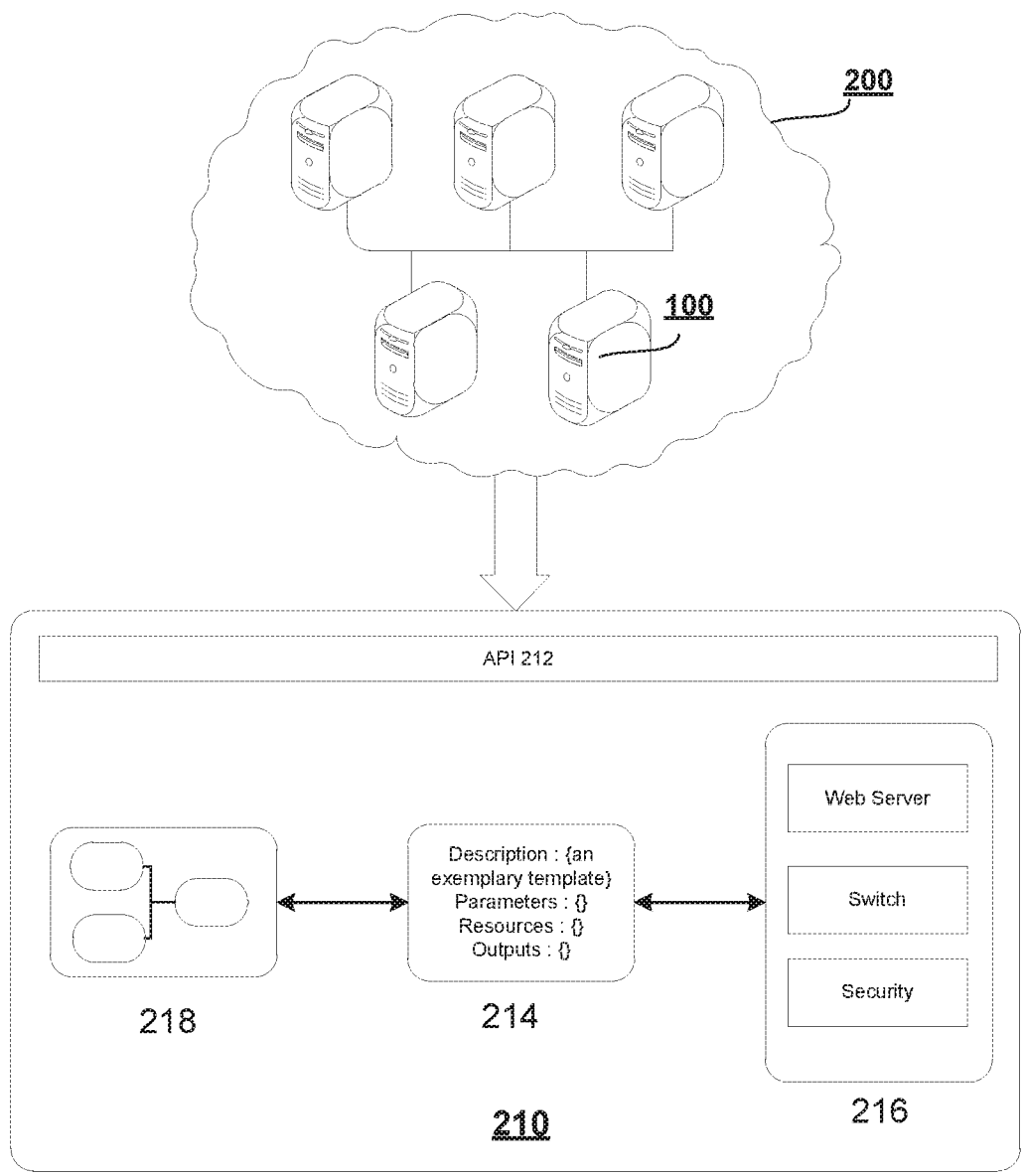
FIG. 2A illustrates a schematic diagram of an exemplary resource orchestration service, according to some embodiments of the disclosure.

FIG. 2A illustrates a schematic diagram of an exemplary resource orchestration service 210, according to some embodiments of the disclosure.

As discussed above, a plurality of cloud service device 100 can form a cloud service system 200, which can further provide resource orchestration service (ROS) 210 to a client of cloud service system 200. Cloud service system 200 can also expose an application programming interface (API) 212 to the client to instantiate, maintain, and modify cloud resources to run services and application over cloud.

The cloud resources can be virtual resources provided cloud service system 200. For example, the cloud resources can include a virtual compute node, a virtual database, a virtual web server, and the like. It is appreciated that, the cloud resources can also be mapped to actual physical components (e.g., an actual server).

The cloud resources can be described in a template 214 and instantiated into a stack 216 of instances. ROS 210 can provide transformation between template 214 and stack 216.

Template 214 can be implemented as a text file in accordance with a given format. For example, template 214 can be a text file formatted in Javascript Object Notation (JSON), Yet Another Markup Language (YAML), or any suitable language. As an example, template 214 can include codes as below.

```
{
  "Parameters": { },
  "Mappings": { },
  "ROSTemplateFormatVersion": "2015-09-01",
  "Outputs": {
  },
  "Resources": {
    "Instance1": {
      "Type": "ALIYUN::ECS::Instance",
      "Properties": {
        "VpcId": "vpc-bp1dpntz618ya58f8dq85",
        "SecurityGroupId": "sg-bp1hsswqpzkavexd4g54",
        "VSwitchId": "vsw-bp1ctrw0rwnw7p17i5ugc",
        "ImageId": "centos_7_06_64_20G_alibase_20190711.vhd",
        "InstanceType": "ecs.g5.large",
      }
    }
    "Instance2": {
      "Type": " ALIYUN::SLB::LOADBALANCER",
    }
    "Instance3": {
      "Type": "ALIYUN::RDS::DBINSTANCE",
    }
  },
  "Conditions": { }
}
```

Template 214 can include a plurality of fields for describing resources (e.g., "Resources: { }" in above template 214) to be deployed for the execution of an application or on-line service along with inter-connection between them. The plurality of fields can include, for example, a field of "Type" for indicating a type of a resource, a field of "VpcId" for indicating an identification of a virtual private cloud hosting the resources, a field of "SecurityGroupId" for indicating an identification of a security group for the resources, a field of "VSwitchId" for indicating an identification of a virtual switch, a field of "InstanceType" for indicating a type of the resource, and the like.

More particularly, a type of a resource can be directed to one of a server load balancer, a virtual private cloud, an elastic compute service (ECS), a relational database service (RDS), a virtual switch, or a virtual security group. In the above example, an ECS instance, a load balancer instance, and an RDS instance are defined in the above example as the resources to be instantiated. It is appreciated that resources defined in template 214 can be customized by the client based on its actual demands, and template 214 can further define properties of these resources (e.g., an identification, a private IP address, connection between resources, and the like). For example, a template can further include an "attachment" clause to define the connection between resources.

Resources defined in template 214 can be instantiated by parameterizing template 212 with different configuration values. For example, "Parameters: { }" in template 214 can include an image identifier ("ImageId"), an instance type ("InstanceType"), and a password ("Password"). The image identifier can be used to define a unique identifier of an image that is required by an elastic compute service instance. The instance type can be used to define, e.g., a size of an instance to large. The password can be used to define the password to access the instance.

After the resources are instantiated, a collection of the instantiated resources (also referred to as instances) can be referred to as stack 216. Stack 216 can be created by providing template 214 and parameters to cloud service system 200 for instantiation. It is appreciated that template 214 can be inherently provided by cloud service system 200 or designed by the client. The client can also modify template 214 to update stack 216. For example, ROS 210 provides an action of "UpdateStack" for updating a stack by providing updated parameters to the specified stack (e.g., stack 216).

Instances of stack 216 can interact with cloud service system 200 via, e.g., API 212. In some embodiments, cloud service system 200 can scan instances of stack 216 (e.g., the ECS instance, the load balancer instance, or the RDS instance) to acquire properties of the instances of stack 216. For example, cloud service system 200 can use an API of "ECS DescribeInstances" to acquire properties of an instance, such as an image identity, a serial number, a host name, a creation time, an instance name, and the like.

As template 214 describes resources in the format of codes, it is not straightforward to a client. For example, the client may not understand a structure of resources defined in a template without reading through every line of the codes in JSON or YAML. Embodiments of the disclosure provide a deployment architecture to visually illustrate the structure of resources defined in a template or a stack. In some embodiments, as shown in FIG. 2A, template 214 can be further transformed into deployment architecture 218.

Figure 2B:
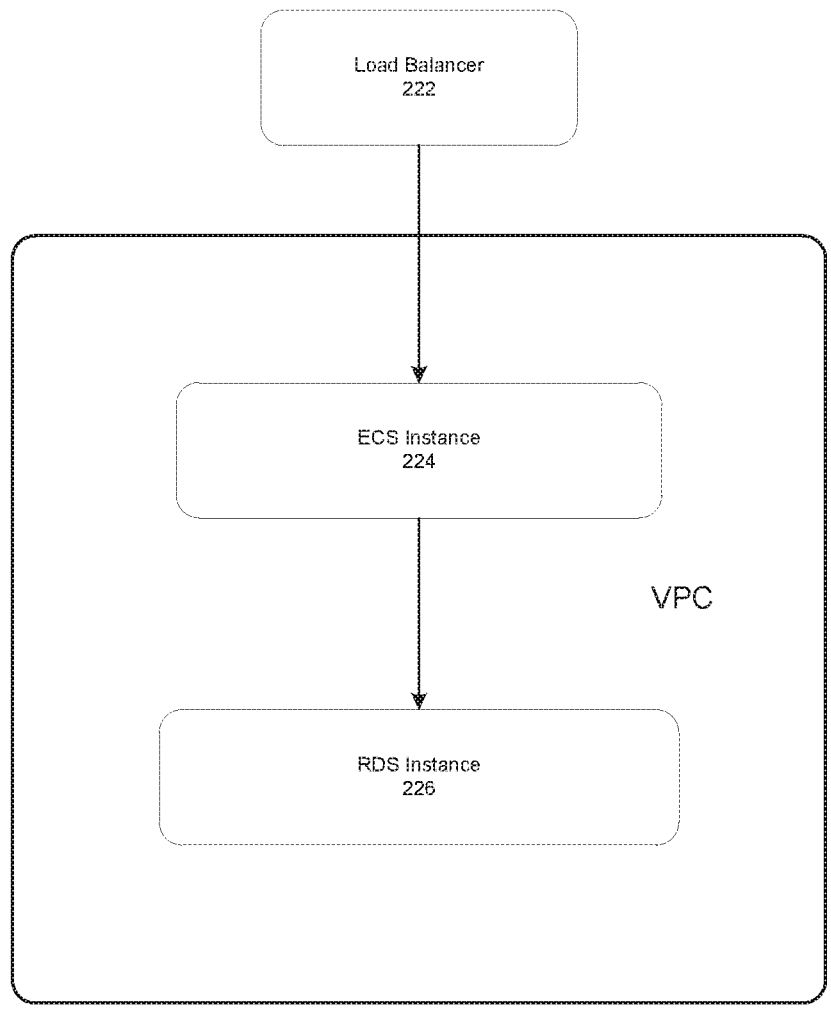
FIG. 2B illustrates a schematic diagram of an exemplary deployment architecture, according to some embodiments of the disclosure.

FIG. 2B illustrate a schematic diagram of an exemplary deployment architecture 218, according to some embodiments of the disclosure. As shown in FIG. 2B, a load balancer 222, an ECS instance 224, and an RDS instance 226, as defined accordingly in above template 214, are connected sequentially.

Figure 3:
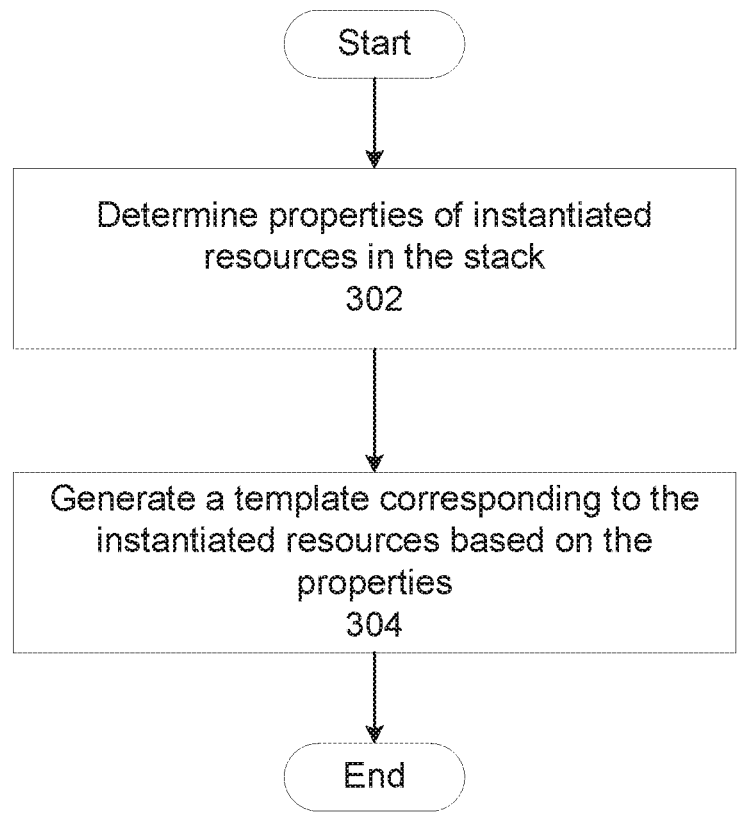
FIG. 3 illustrates a flowchart of an exemplary method for generating a template based on a stack of instantiated resources, according to some embodiments of the disclosure.

FIG. 3 illustrates a flowchart of an exemplary method 300 for generating a template based on a stack of instantiated resources, according to some embodiments of the disclosure. Method 300 can be executed by, for example, cloud service system 200 including at least one cloud service device 100 of FIG. 1 and FIG. 2A. Method 300 can include steps as follows.

At step 302, properties of the instantiated resources in the stack can be determined. As discussed with reference to FIG. 2A, the API of "ECS DescribeInstances" can be used for acquiring the properties of the instantiated resources, and acquired properties of the instantiated resources can be then received by cloud service system 200.

At step 304, a template corresponding to the instantiated resources can be generated based on the properties. The template can be a default template provided by cloud service system 200 or designed by a client of cloud service system 200. As discussed above, the template can include, for example, a field of "Type" for indicating a type of a resource. And the resource is associated with an instantiated resource in the stack. Therefore, in some embodiments, a property corresponding to a field of the template can be determined among the properties of the instantiated resources, and the field of the template can be set based on the corresponding property. For example, among all the received properties of the instantiated resources, a property of the instance type being an ECS instance is determined, and therefore, the field of "Type" can be set to "ALIYUN::ECS::Instance."

It is appreciated that the received properties of the instantiated resources can include more information than the template can ingest. For example, a start time of an instance can also be determined as a property of the instance, but the start time of the instance may not be defined in the template and cannot be used. Therefore, in some embodiments, only the properties corresponding to fields of the template can be identified and used for completing the template.

Thus, a template can be automatically generated based on a stack of instantiated resources by using method 300.

Figure 4A:
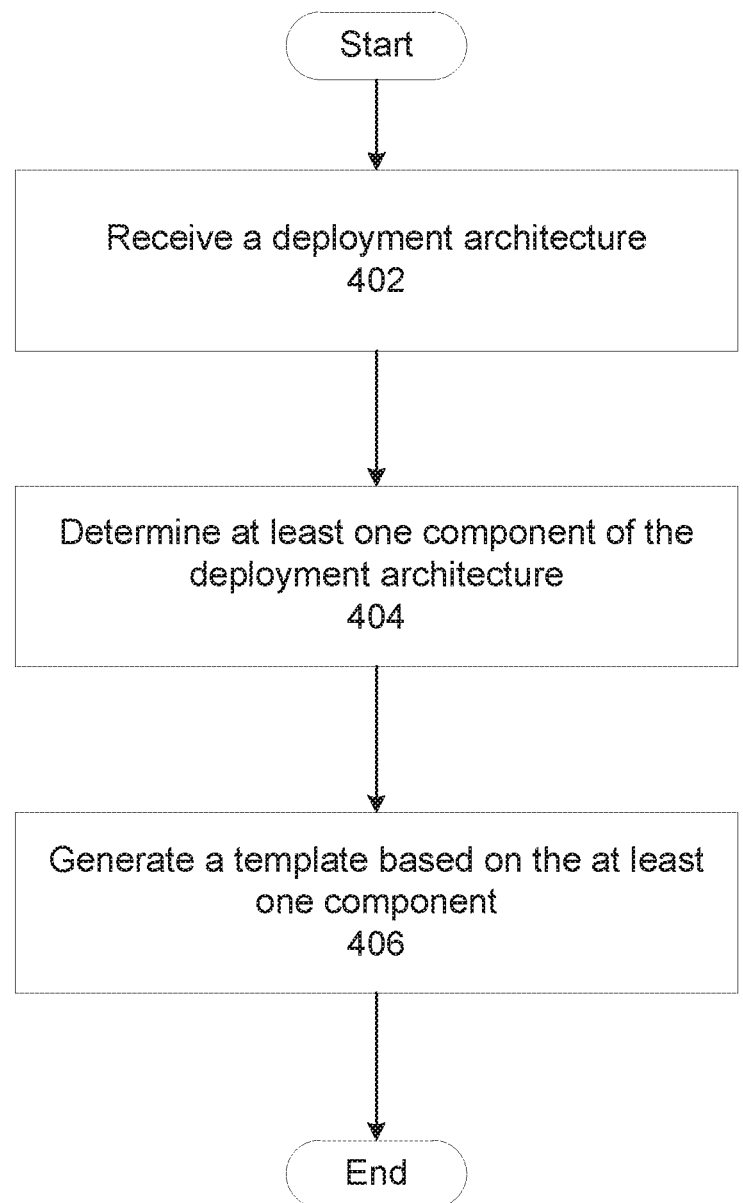
FIG. 4A illustrates a flowchart of an exemplary method for generating a template based on a deployment architecture, according to some embodiments of the disclosure.

FIG. 4A illustrates a flowchart of an exemplary method 400 for generating a template based on a deployment architecture, according to some embodiments of the disclosure. Method 400 can be executed by, for example, cloud service system 200 including at least one cloud service device 100 of FIG. 1 and FIG. 2A. Method 400 can include steps as follows.

At step 402, a deployment architecture can be received. As shown in FIG. 2B, the deployment architecture can include visual illustration of the architecture of instantiated resources, which enables a client of cloud service system 200 to design the deployment architecture in a straightforward manner. In some embodiments, the deployment architecture can be created or updated by the client of cloud service system 200. For example, the client can determine a type of the deployment architecture to be created as e.g., a three-layer architecture, and system 200 can provide a blank deployment architecture of the determined type.

Figure 4B:
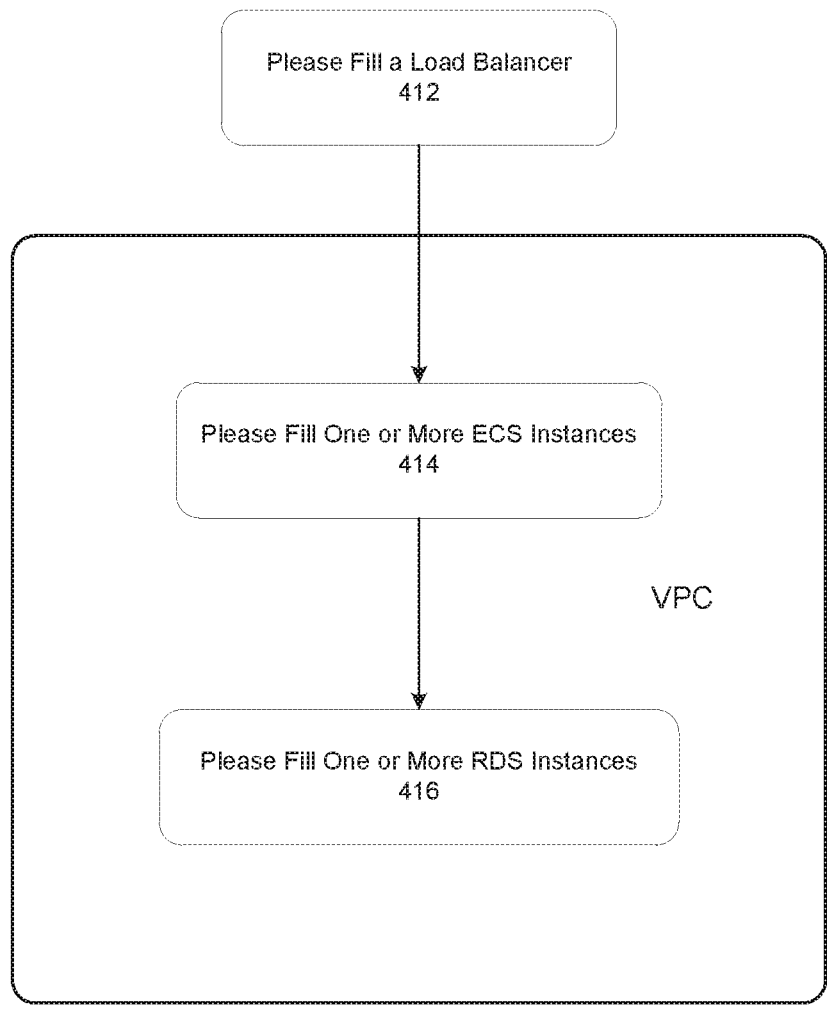
FIG. 4B illustrates a schematic diagram of an exemplary blank deployment architecture, according to some embodiments of the disclosure.

FIG. 4B illustrates an exemplary blank deployment architecture 410, according to some embodiments of the disclosure. As shown in FIG. 4B, blank deployment architecture 410, which is a three-layer architecture, can include three layers to be assigned with instantiated resources. For example, blank deployment architecture 410 can invite the client to fill a load balancer at 412, one or more ECS instances at 414, and one or more RDS instances at 416, which can be dragged to blank deployment architecture 410 by the client.

Figure 4C:
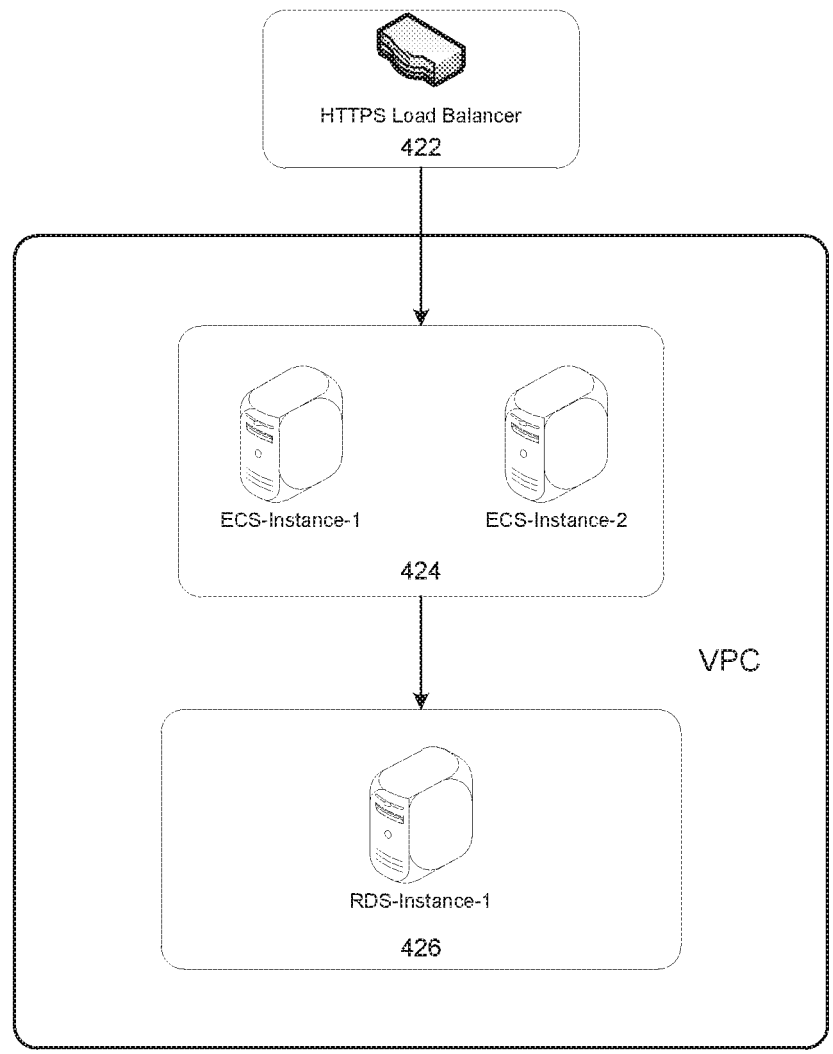
FIG. 4C illustrates a schematic diagram of an exemplary created deployment architecture, according to some embodiments of the disclosure.

FIG. 4C illustrates an exemplary created deployment architecture 420, according to some embodiments of the disclosure. As shown in FIG. 4C, created deployment architecture 420 includes, as its components, an HTTPS load balancer 422, two ECS instances 424, and an RDS instance 426.

It is appreciated that, other than creating a deployment architecture, an existing deployment architecture can be stored and provided to cloud service system 200.

Referring back to FIG. 4A, at step 404, at least one component of the deployment architecture can be determined. For example, deployment architecture 420 can include components of HTTPS load balancer 422, two ECS instances 424, and RDS instance 426.

At step 406, a template can be generated based on the at least one component. In some embodiments, cloud service system 200 can provide a plurality of template candidates. And among the plurality of template candidates, a template corresponding to the deployment architecture (e.g., deployment architecture 420) can be determined. For example, cloud service system 200 can collect information of the components of deployment architecture 420, and identify HTTPS load balancer 422, two ECS instances 424, and RDS instance 426. Because these components are the standard components for a three-layer architecture, cloud service system 200 can determine a template corresponding to the three-layer architecture. Then, a component corresponding to an instance schema of the template can be determined. The instance schema can be used to describe a resource in the template, including e.g., properties of the resource. Therefore, each of the at least one component can correspond to an instance schema of the template. By determining a component corresponding an instance schema of the template, the instance schema of the template can be further filled based on the determined component, e.g., by filling parameters for the properties of the resource.

Thus, a template can also be automatically generated based on a deployment architecture by using method 400.

Figure 5:
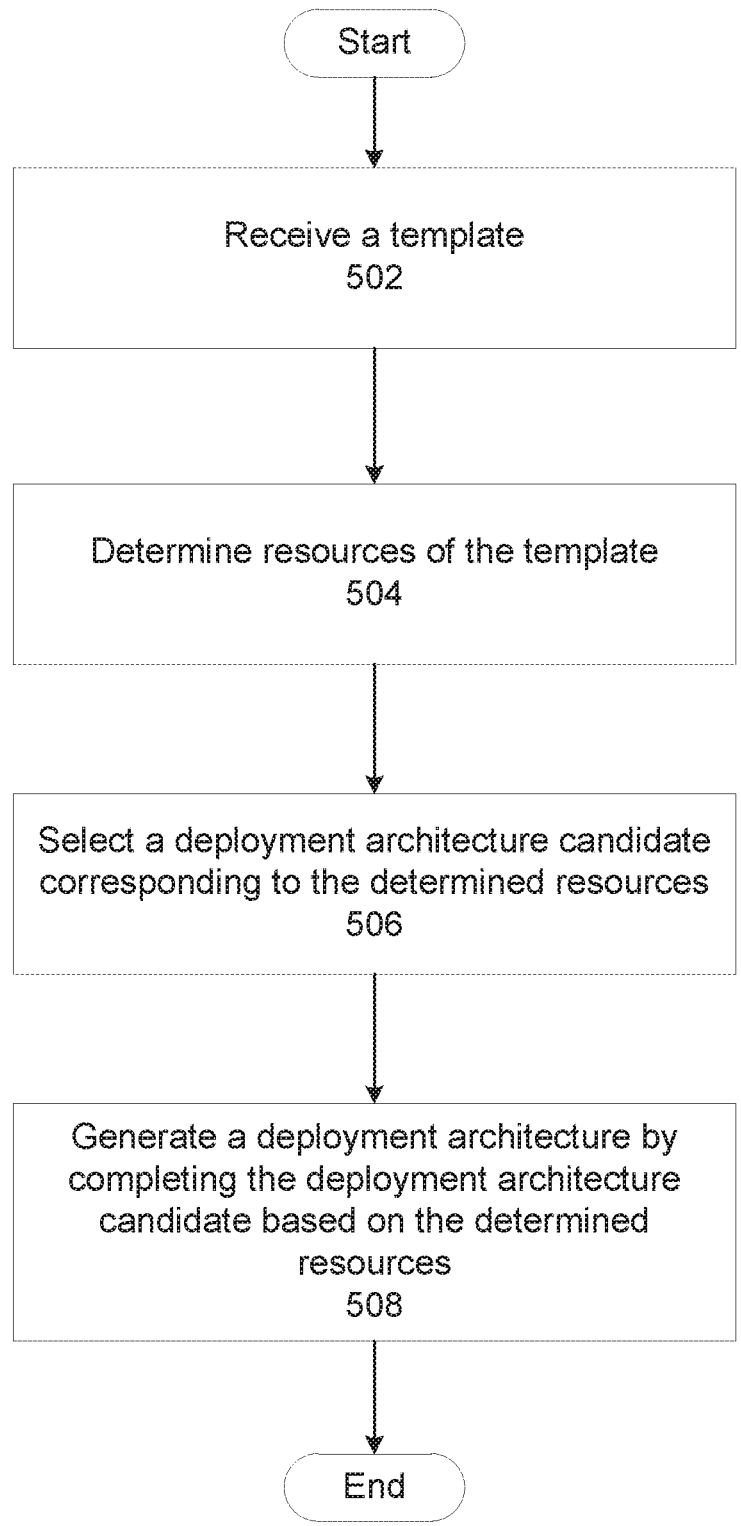
FIG. 5 illustrates a flowchart of an exemplary method for generating a deployment architecture based on a template, according to some embodiments of the disclosure.

FIG. 5 illustrates a flowchart of an exemplary method 500 for generating a deployment architecture based on a template, according to some embodiments of the disclosure. Method 400 can be executed by, for example, cloud service system 200 including at least one cloud service device 100 of FIG. 1 and FIG. 2A. Method 500 can include steps as follows.

At step 502, a template can be received. The template can be one of the default templates provided by cloud service system 200 or a template created by a client of cloud service system 200.

At step 504, resources of the template can be determined. For example, the resources of the template can include at least one of a server load balancer, a virtual private cloud, an elastic compute service (ECS), a relational database service (RDS), a virtual switch, or a virtual security group, and cloud service system 200 can identify these resources, e.g., according to the syntax of the template. In some embodiments, the template can further include layout information of resources of the template, e.g., by using the "Attachment" clause.

At step 506, among a plurality of architecture candidates, a deployment architecture candidate corresponding to the determined resources can be selected. In some embodiments, cloud service system 200 can provide a plurality of architecture candidates, and each of the plurality of architecture candidates can include certain components corresponding to the architecture candidate. For example, a three-layer deployment architecture can include a load balancer, an ECS instance, and an RDS instance. Therefore, if the determined resources include a load balancer, an ECS instance, and an RDS instance, cloud service system 200 can select, among the plurality of architecture candidates, a three-layer deployment architecture candidate, which corresponds to the determined resources.

In some embodiments, if the layout information of resources is included in the template, cloud service system 200 can further select the deployment architecture candidate using the layout information of the resources determined at step 504 based on the template. For example, cloud service system 200 can determine the layout information by parsing the "Attachment" clause. Then, cloud service system 200 can select, among the plurality of architecture candidates, the deployment architecture candidate based on the layout information of the determined resources.

In some embodiments, the deployment architecture candidate can be a blank deployment architecture as shown in FIG. 4B.

At step 508, a deployment architecture can be generated by completing the deployment architecture candidate based on the determined resources. For example, the deployment architecture candidate can be filled with corresponding resources. If the layout information is given, the layout information can be, for example, used to verify connection between the resources. Therefore, the generated deployment architecture can include visual illustration of the resources and the layout information.

Thus, a deployment architecture can also be automatically generated based on a template by using method 500.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a processor storage, a semiconductor storage device, or any suitable combination of the foregoing. A non-transitory computer readable medium may be provided that stores instructions to carry out the embodiments described above. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a ROM, a PROM, and EPROM, a FLASH-EPROM or any other flash memory, NVRAM, a cache, a register, any other memory chip or cartridge, and networked versions of the same.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The embodiments may further be described using the following clauses:

1. A computer-implemented method for generating a template based on a stack of instantiated resources, comprising:
    determining properties of the instantiated resources in the stack; and
    generating a template corresponding to the instantiated resources based on the properties.

2. The method of clause 1, wherein determining the properties of the instantiated resources in the stack further comprises:

using an application programming interface for acquiring the properties of the instantiated resources; and receiving acquired properties of the instantiated resources.

3. The method of clause 1 or 2, wherein generating the template corresponding to the instantiated resources based on the properties further comprises:

determining, among the properties of the instantiated resources, a property corresponding to a field of the template; and setting the field of the template based the corresponding property.

4. A computer-implemented method for generating a template based on a deployment architecture, comprising:

receiving a deployment architecture;

determining at least one component of the deployment architecture; and generating a template based on the at least one component.

5. The method of clause 4, wherein generating the template based on the at least one component further comprises:

determining, among a plurality of template candidates, the template corresponding to the deployment architecture;

determining a component of the at least one component corresponding to an instance schema of the template; and filling the instance schema of the template based on the determined component.

6. The method of clause 4 or 5, wherein the deployment architecture is a three-layer architecture.

7. A computer-implemented method for generating a deployment architecture based on a template, comprising:

receiving a template;

determining resources of the template;

selecting, among a plurality of architecture candidates, a deployment architecture candidate corresponding to the determined resources; and generating a deployment architecture by completing the deployment architecture candidate based on the determined resources.

8. The method of clause 7, wherein selecting the deployment architecture corresponding to the determined resources further comprises:

determining layout information of the determined resources based on the template; and selecting, among the plurality of architecture candidates, the deployment architecture based on the layout information of the determined resources.

9. The method of clause 8, wherein the deployment architecture comprises visual illustration of the resources and the layout information.

10. A system for generating a template based on a stack of instantiated resources, comprising:

a memory storing a set of instructions; and at least one processor configured to execute the set of instructions to cause the system to:

determine properties of the instantiated resources in the stack; and generate a template corresponding to the instantiated resources based on the properties.

11. The system of clause 10, wherein in determining the properties of the instantiated resources in the stack, the set of instructions is further executed to cause the system to:

use an application programming interface for acquiring the properties of the instantiated resources; and receive acquired properties of the instantiated resources.

12. The system of clause 10 or 11, wherein in generating the template corresponding to the instantiated resources based on the properties, the set of instructions is further executed to cause the system to:

determine, among the properties of the instantiated resources, a property corresponding to a field of the template; and set the field of the template based the corresponding property.

13. A system for generating a template based on a deployment architecture, comprising:

a memory storing a set of instructions; and at least one processor configured to execute the set of instructions to cause the system to:

receive a deployment architecture;

determine at least one component of the deployment architecture; and generate a template based on the at least one component.

14. The system of clause 13, wherein in generating the template based on the at least one component, the set of instructions are configured to be further executed to cause the system to:

determine, among a plurality of template candidates, the template corresponding to the deployment architecture;

determine a component corresponding to an instance schema of the template; and fill the instance schema of the template based on the determined component.

15. The system of clause 13 or 14, wherein the deployment architecture is a three-layer architecture.

16. A system for generating a deployment architecture based on a template, comprising:

a memory storing a set of instructions; and at least one processor configured to execute the set of instructions to cause the system to:

receive a template;

determine resources of the template;

select, among a plurality of architecture candidates, a deployment architecture candidate corresponding to the determined resources; and generate a deployment architecture by completing the deployment architecture candidate based on the determined resources.

17. The system of clause 16, wherein in selecting the deployment architecture corresponding to the determined resources, the set of instructions are configured to be further executed to cause the system to:

determine layout information of the determined resources based on the template; and select, among the plurality of architecture candidates, the deployment architecture based on the layout information of the determined resources.

18. The system of clause 17, wherein the deployment architecture comprises visual illustration of the resources and the layout information.

19. A non-transitory computer readable medium that stores a set of instructions that is executable by at least one processor of a computer system to cause the computer system to perform a method for generating a template based on a stack of instantiated resources, the method comprising:

determining properties of the instantiated resources in the stack; and generating a template corresponding to the instantiated resources based on the properties.

20. A non-transitory computer readable medium that stores a set of instructions that is executable by at least one processor of a computer system to cause the computer system to perform a method for generating a template based on a deployment architecture, the method comprising:

receiving a deployment architecture;
determining at least one component of the deployment architecture; and
generating a template based on the at least one component.

21. A non-transitory computer readable medium that stores a set of instructions that is executable by at least one processor of a computer system to cause the computer system to perform a method for generating a deployment architecture based on a template, the method comprising:
receiving a template;
determining resources of the template;
selecting, among a plurality of architecture candidates, a deployment architecture candidate corresponding to the determined resources; and
generating a deployment architecture by completing the deployment architecture candidate based on the determined resources.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

Although the specification has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for generating a template based on a stack of multiple instantiated cloud resources, comprising:
determining properties of the multiple instantiated cloud resources in the stack by scanning the stack of the multiple instantiated cloud resources with an application programming interface, the multiple instantiated cloud resources having been instantiated into the stack; and
generating, based on the stack of the multiple instantiated could resources, a template corresponding to the multiple instantiated cloud resources based on the properties determined by scanning the stack of the multiple instantiated cloud resources, wherein the template is in a text file format and comprises a plurality of fields for describing each of the multiple instantiated cloud resources and the plurality of fields correspond to the determined properties.

2. The method of claim 1, wherein determining the properties of the multiple instantiated cloud resources in the stack by scanning the stack further comprises:
receiving the properties of the multiple instantiated cloud resources in response to the scanning.

3. The method of claim 1, wherein generating the template corresponding to the multiple instantiated cloud resources based on the properties further comprises:
determining, among the properties of the multiple instantiated cloud resources, a property corresponding to each field of the plurality of fields; and
setting the each field to be indicative of the corresponding property.

4. A system for generating a template based on a stack of multiple instantiated cloud resources, comprising:
a memory storing a set of instructions; and
at least one processor configured to execute the set of instructions to cause the system to perform:
determining properties of the multiple instantiated cloud resources in the stack by scanning the stack of the multiple instantiated cloud resources with an application programming interface, the multiple instantiated cloud resources having been instantiated into the stack; and
generating, based on the stack of the multiple instantiated could resources, a template corresponding to the multiple instantiated cloud resources based on the properties determined by scanning the stack of the multiple instantiated cloud resources, wherein the template is in a text file format and comprises a plurality of fields for describing each of the multiple instantiated cloud resources and the plurality of fields correspond to the determined properties.

5. The system of claim 4, wherein in determining the properties of the multiple instantiated cloud resources in the stack by scanning the stack, the set of instructions is further executed to cause the system to:
receive the properties of the multiple instantiated cloud resources in response to the scanning.

6. The system of claim 4, wherein in generating the template corresponding to the multiple instantiated cloud resources based on the properties, the set of instructions is further executed to cause the system to:
- determine, among the properties of the multiple instantiated cloud resources, a property corresponding to each field of the plurality of fields; and
- setting the each field to be indicative of the corresponding property.

7. A non-transitory computer readable medium that stores a set of instructions that is executable by at least one processor of a computer system to cause the computer system to perform a method for generating a template based on a stack of multiple instantiated cloud resources, the method comprising:
- determining properties of the multiple instantiated cloud resources in the stack by scanning the stack of the multiple instantiated cloud resources with an application programming interface, the multiple instantiated cloud resources having been instantiated into the stack; and
- generating, based on the stack of the multiple instantiated could resources, a template corresponding to the multiple instantiated cloud resources based on the properties determined by scanning the stack of the multiple instantiated cloud resources, wherein the template is in a text file format and comprises a plurality of fields for describing each of the multiple instantiated cloud resources and the plurality of fields correspond to the determined properties.

8. The non-transitory computer readable medium of claim 7, wherein in determining the properties of the multiple instantiated cloud resources in the stack by scanning the stack, the at least one processor of the computer system is further configured to execute the set of instructions to cause the computer system to perform:
- receiving the properties of the multiple instantiated cloud resources in response to the scanning.

9. The non-transitory computer readable medium of claim 7, wherein in generating the template corresponding to the multiple instantiated cloud resources based on the properties, the at least one processor of the computer system is further configured to execute the set of instructions to cause the computer system to perform:
- determining, among the properties of the multiple instantiated cloud resources, a property corresponding to each field of the plurality of fields; and
- setting the each field to be indicative of the corresponding property.

* * * * *